US005194856A

United States Patent [19]

Zijlstra

[11] Patent Number: 5,194,856

[45] Date of Patent: Mar. 16, 1993

[54] SYSTEM FOR DETECTING THE PRESENCE IN A RACK OF A PORTABLE UNIT SUITABLE FOR TRANSMITTING OR RECEIVING A SIGNAL CONTAINING AN IDENTIFICATION NUMBER ASSIGNED THERETO

[75] Inventor: Gauke K. Zijlstra, Emmen, Netherlands

[73] Assignee: Ericsson Radio Systems B.V., Va Emmen, Netherlands

[21] Appl. No.: 711,904

[22] Filed: Jun. 7, 1991

[30] Foreign Application Priority Data

Jun. 11, 1990 [NL] Netherlands ........................ 9001318

[51] Int. Cl.[5] ............................................ H04B 7/00

[52] U.S. Cl. .......................... 340/825.35; 340/825.44; 340/568; 235/385

[58] Field of Search .............. 340/568, 825.35, 825.44, 340/311.1; 364/478, 479; 235/385

[56] References Cited

U.S. PATENT DOCUMENTS

| | | | |
|---|---|---|---|
| 3,808,538 | 4/1974 | Goransson et al. | 455/31.1 |
| 3,973,200 | 8/1976 | Akerberg | 340/825.44 |
| 4,595,922 | 6/1986 | Cobb et al. | 340/825.49 |
| 4,636,634 | 1/1987 | Harper et al. | 235/385 |
| 4,636,950 | 1/1987 | Caswell et al. | 235/385 |
| 4,661,806 | 4/1987 | Peters et al. | 340/568 |

FOREIGN PATENT DOCUMENTS

| | | |
|---|---|---|
| 7216307 | 6/1974 | Netherlands . |
| 417410 | 2/1967 | Switzerland . |

*Primary Examiner*—Donald J. Yusko
*Assistant Examiner*—Dervis Magistre
*Attorney, Agent, or Firm*—Burns, Doane, Swecker & Mathis

[57] ABSTRACT

A system for detecting the presence in a compartment of a rack of a portable transmission unit of a number of portable transmission units, each being capable for transmitting or for receiving a signal containing an identification number assigned to the unit. All compartments of the rack or only compartments receiving or having received the units therein are scanned. The presence of a unit in a compartment is acknowledged by the unit after it has received a scanning signal, being identical for each scanned compartment, by providing a response signal comprising the identification number assigned to the unit. For each unit which is present, or until the actual scanning thereof was present, in a compartment a control circuit updates a datum, indicating the presence of the unit in a compartment, in a memory. Updating of the datum for absence can be carried out if a response signal is not received within a predetermined time or if a detection means, assigned individually to each compartment, detects a removement from a compartment for which a presence datum was set before.

15 Claims, 10 Drawing Sheets

SYSTEM FOR DETECTING THE PRESENCE IN A RACK OF A PORTABLE UNIT SUITABLE FOR TRANSMITTING OR RECEIVING A SIGNAL CONTAINING AN IDENTIFICATION NUMBER ASSIGNED THERETO

BACKGROUND OF THE INVENTION

The invention relates to a presence detection system for detecting the presence of a unit of a number of portable transmission units in a compartment of a rack of one or more racks each having a number of compartments, each portable unit having a control circuit and a transmitting or receiving circuit connected to the control circuit for the wireless transmission or reception, respectively, of a signal containing an identification number assigned to the unit and each unit having a register for storing the assigned number, a reception means for receiving a scanning signal from outside the unit and a transmission means for transmitting a response signal in response to a received scanning signal, and there being added to at least one rack a detection unit having a control circuit connected to a transmission means for transmitting the scanning signal, a reception means for receiving a response signal, a memory having a location for each portable unit for storing therein a datum which indicates the presence of the portable unit in the rack and a processing means for processing a presence datum read out of the memory by the control circuit. The portable unit may, for example, be a paging unit of a personnel paging system, a transponder, an alarm transmitter or an electronic key.

A presence detection system of this sort which is used for a personnel paging system is known from practice. In the known presence detection system, each rack has a single common transmission means for supplying the scanning signal to all the portable units in the rack and a single common reception means for receiving a response signal which is transmitted by a portable unit placed in the rack.

The known detection system is known in two embodiments having a first or second mode of operation, respectively.

According to a first mode of operation of the known detection system, a control circuit of an exchange of the paging system generates, during the time between the transmission of normal paging messages, a scanning signal for each of the portable units of the paging system in succession, which scanning signal contains the identification number of the paging unit and is supplied via the rack to the receiver in the rack. A paging unit placed in the rack compares the identification number of a received scanning signal with the assigned identification number stored in the register of the paging unit. In the event of identity, the paging unit will generate the response signal, which in this mode of operation has only a binary nature and thereby indicates the possible presence of the paging unit in a rack. Because the transmission of a scanning signal takes place serially and lasts for a relatively long time, so little time may be left over in an extensive paging system containing many paging units or in a paging system having many calls that the contents of the memory locations may lag for an undesirably long time behind the current situation. Because, in a paying system, prior to transmitting a normal (i.e. for paging the unit) paging message intended for a paging unit, the exchange first checks whether the portable unit is in a rack, that is to say whether in general a user to whom the paging unit has been assigned is not present, and because the transmission of a normal message on average lasts equally as long as the transmission of a scanning signal, unnecessary paging messages are often transmitted, or erroneously not transmitted, by the exchange in an extensive or busy paging system of this type. Because a normal paging message is in general retransmitted if no response is received by the exchange from a portable unit or from a user to whom the unit has been assigned, it may under these circumstances take an undesirably long time before normal paging messages intended for different paging units are transmitted and the paging system may itself become overloaded without its normal paging capacity being fully utilised.

In relation to the serial transmission of a scanning signal, it is pointed out that in a personnel paging system, each portable unit usually has a power saving mode in which a minimum current is supplied by a supply of the paging unit, the paging unit being activated to assume an operating mode in which the paging unit can process data from a received transmission signal if the paging unit has received a lead signal for a sufficiently long time. The time for transmitting a scanning signal may therefore be, for example, 1.25 to 6.75 s. At the same time, this method of scanning also has the drawback that all the paging units are activated regardless of the identification number of the scanning signal for every transmission of a scanning signal, as a result of which the supply of the paging units becomes exhausted earlier.

According to another mode of operation of the known system, the portable units are scanned in groups in a manner such that for every thousands digit of all the identification numbers used in the system the exchange transmits a scanning signal, that every paging unit which is in a rack and of which the thousands digit of the identification number assigned to the unit is identical to the thousands digit of a received scanning signal transmits a response signal, that the exchange scans the hundreds in a similar manner on receiving a response signal for a thousands digit, and that the exchange, on receiving a response signal for a hundred, transmits all the associated identification numbers consecutively in order to be able to receive separately a response signal from every paging unit in a rack. The total cycle time for scanning the portable units for their presence in a rack may in this case be relatively short, but increases considerably as more paging units are placed in a rack. Another drawback is that the exchange requires more time to form a scanning signal in this second mode of operation of the system than in the first mode of operation of the system.

SUMMARY OF THE INVENTION

The object of the invention is to eliminate the drawbacks of the known presence detection system.

For this purpose, the presence detection system of the type mentioned in the introduction is according to the invention characterised in that to each compartment an individual transmission means of the detection unit is assigned, that each pair of a transmission means of a compartment and a reception means of a portable unit placed in the compartment is so designed that the reception means of the pair is only sensitive to the scanning signal transmitted by the transmission means of the pair, that the scanning signal is identical for all the compartments, that the control circuit of the detection unit selectively chooses the transmission means connected thereto to transmit the scanning signal, that the response signal transmitted by a portable unit contains the identification number of the portable unit, that if the control circuit of the detection unit receives a response signal, the control circuit of the detection unit alters the contents of the memory location associated with the identification number of the response signal in a manner such that it indicates the presence of the associated portable unit in a rack, and that, if the control circuit does not receive a response signal in response to a scanning signal and if a response signal has been received in response to a previous transmission of the scanning signal via the same transmission means of the compartment, the control circuit alters the contents of the memory location associated with the identification number of the response signal in a manner such that it indicates the absence of the associated portable unit in a rack. This limits the number of scanning signals to be transmitted per cycle to the number of compartments of all the racks. Because, in general, the number of possible identification numbers is equally as great as the largest possible identification number and said number is, in general, much smaller than the total number of compartments of the detection system, this achieves a large time gain in determining the presence of the different portable units in the racks. As a result, the memory for storing the presence data for the various portable units can be made very quick up to date.

Because an individual transmission means for transmitting the scanning signal is assigned to each compartment and a portable unit placed in the compartment is exclusively capable of receiving the scanning signal transmitted by said transmission means, if the detection system is used for a personnel paging system the transmission of the scanning signal can take place completely separately from a channel for transmitting normal paging messages. As a result of this, the maximum paging capacity of the paging system can be utilised.

According to one feature of the invention, the control circuits of the racks are connected to a common central memory, as a result of which a simple construction of the system can be obtained.

According to another feature of the invention, each rack has a memory connected to the control circuit of the rack and a common central memory is connected to all the rack control circuits. As a result of this, the presence detection takes place locally for each rack, which makes it possible to keep the storage of presence data of the different portable units still more up to date.

According to still another feature of the invention, the compartments are scanned sequentially. Together with the measures of Claim 2, this achieves a very simple embodiment.

According to still another feature of the invention, a scanning signal is, on the contrary, only transmitted if a detection means assigned to a compartment detects a movement of a paging unit into or out of the compartment and the scanning signal is only then transmitted to the transmission means of the compartment. As a result of this, the presence data can be kept still more up to date and the number of messages to be transmitted between each rack and a central control circuit is considerably limited. This applies, in particular, to an embodiment in which the measures according to firstly said another feature are used.

The detection means can have many different embodiments. It may, for example, be a switch. It may be designed for supplying a pulse when a portable unit is moved, regardless of whether the portable unit is moved into or out of the compartment. According to another feature of the invention it may also be designed to supply a detection signal having a first or second state, for example high or low level, when a portable unit is moved into or out of a compartment, respectively.

According to still another feature of the invention it is possible in the system according to the invention to detect autonomously for each compartment whether a portable unit is in the compartment by using a subcontrol circuit which is exclusively assigned to the compartment, which has a register for the intermediate storage of the presence data and which is connected to the transmission means and the reception means of the compartment and to a common control circuit of the rack in order to transfer the presence data in the register to the memory connected to the common control circuit.

BRIEF DESCRIPTION OF THE DRAWINGS

These and other features and advantages will become evident from the explanation of some exemplary embodiments of the invention given below with reference to the accompanying drawings. In the drawings.

DETAILED DESCRIPTION OF PREFERRED EMBODIMENTS

Figure 1:
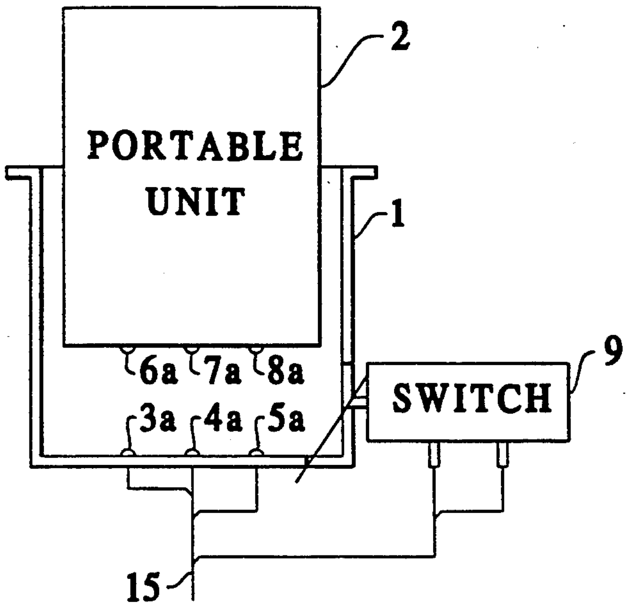
FIG. 1 shows diagrammatically a compartment of a rack with a portable unit placed therein.

FIG. 1 shows diagrammatically a compartment 1 of a rack having a number of similar compartments 1 in which a portable unit 2 can be placed.

In the embodiment of FIG. 1, each compartment 1 has two rows of contacts 3a, 4a, 5a and 3b, 4b, 5b, the last mentioned row not being shown in FIG. 1, of three pairs of contacts 3a and 3b, 4a and 4b, 5a and 5b. Each portable unit 2 has at corresponding places contacts 6a to 8b inclusive which touch the respective contacts 3a to 5b inclusive when the portable unit 2 is placed in the compartment 1.

The pairs 3a, 3b and 6a, 6b serve to charge a storage battery of the portable unit 2 from a supply source (not shown in FIG. 1) of the rack. The pairs of contacts 4a, 4b and 7a, 7b serve to transmit a scanning signal from the rack to the portable unit 2. The pairs 5a, 5b and 8a and 8b serve to transmit a response signal from the portable unit 2 to the rack in response to the reception of a scanning signal.

Figure 7:
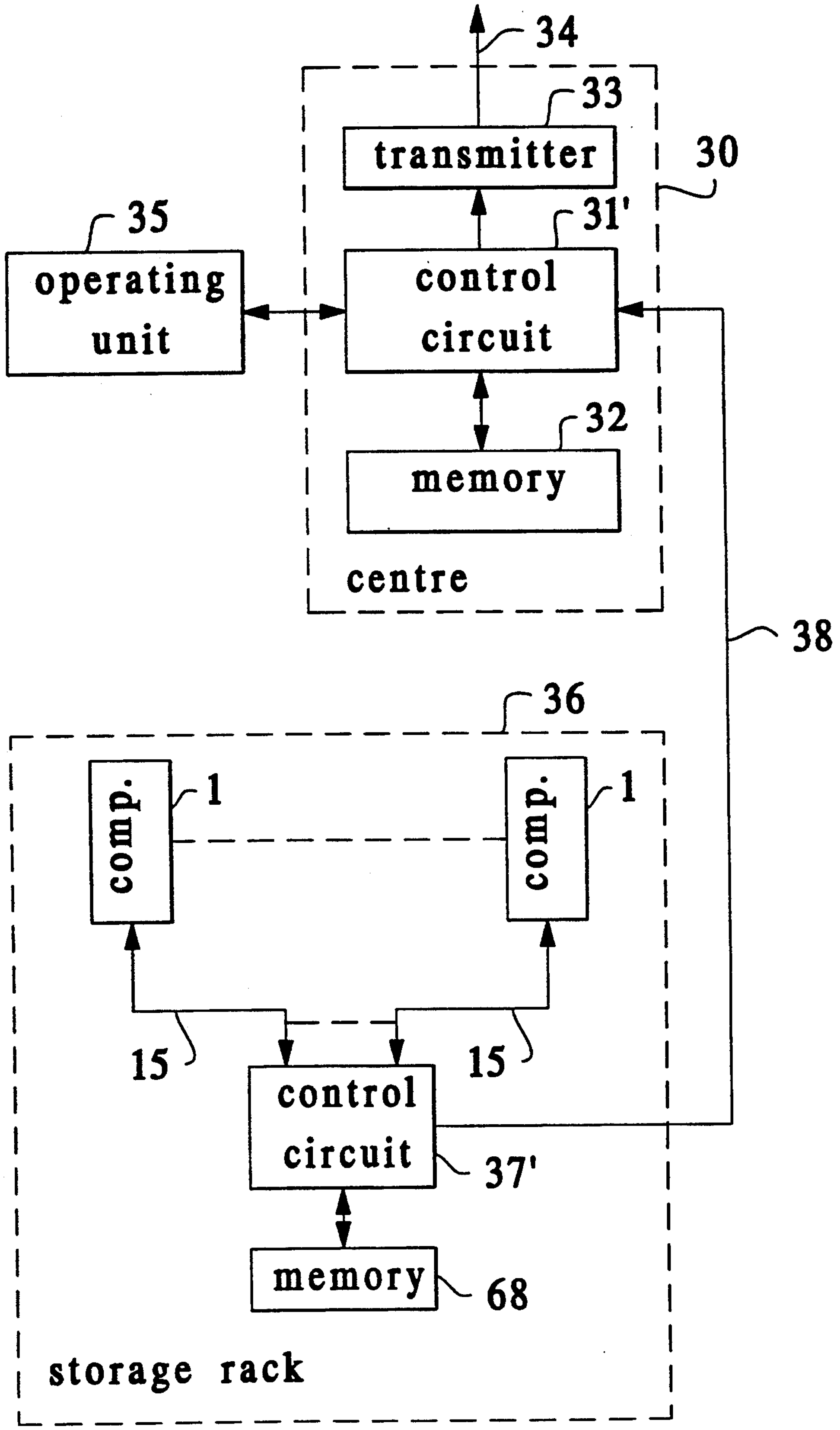
FIG. 7 shows another embodiment of the detection system according invention.

For the embodiment of FIG. 7, each compartment 1 has, in addition, a presence detection means which is a switch 9 in FIG. 1. If the portable unit 2 is moved into or out of the compartment 1, the contacts of the switch 9 are closed or opened, respectively (or vice versa).

Conductors which are connected to the contacts 3a to 5b inclusive and possibly to the switch 9 form a group 15.

The portable unit 2 of the presence detection system according to the invention can be any portable unit which is suitable for the wireless reception and/or transmission of a transmission signal which contains an identification number assigned to the portable unit and stored in a register of the unit.

The portable unit is, for example, a paging unit of a personnel paging system.

Figure 2:
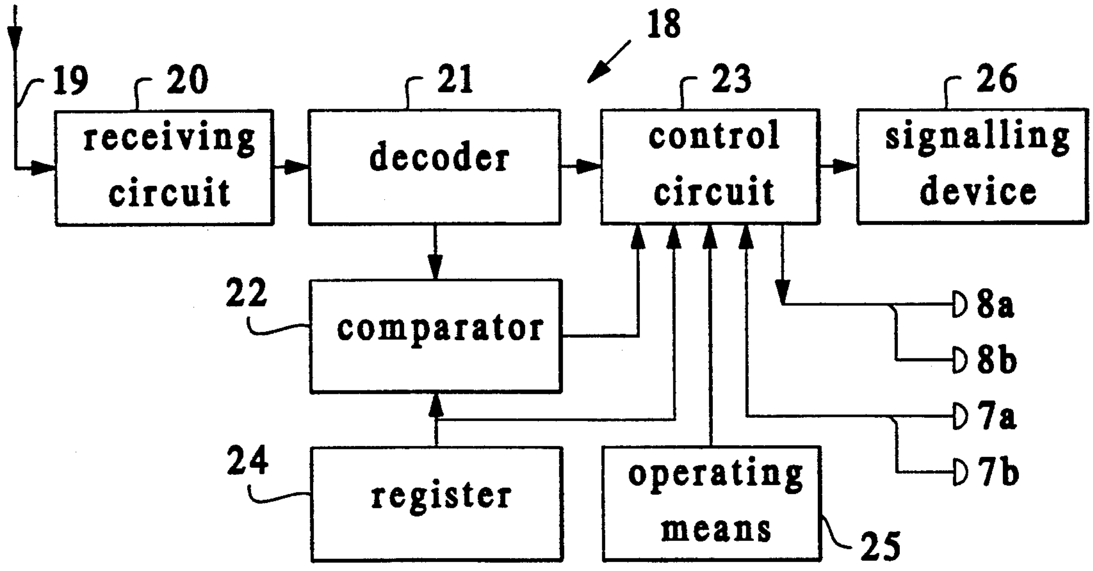
FIG. 2 shows a diagram of a paging unit of paging system as a portable unit of the detection system according to the invention.

FIG. 2 shows a diagram of a paging unit 18 as portable unit 2. The paging unit 18 comprises an aerial 19, a receiving circuit 20 which is connected to the aerial 19 and to a decoder 21, which is connected to a comparator 22, and a control circuit 23, which is connected to a register 24, operating means, such as switches, 25, a signalling device 26 and the contacts 7a to 7b inclusive. The contacts 8a and 8b and a supply circuit connected thereto containing a storage battery of the paging unit 18 are not shown.

The register 24 is also connected to the comparator 22 and contains an identification number assigned to the paging unit 18.

The signalling device 26 may be an optical and/or acoustic and/or electromechanical signalling device.

Figure 3:
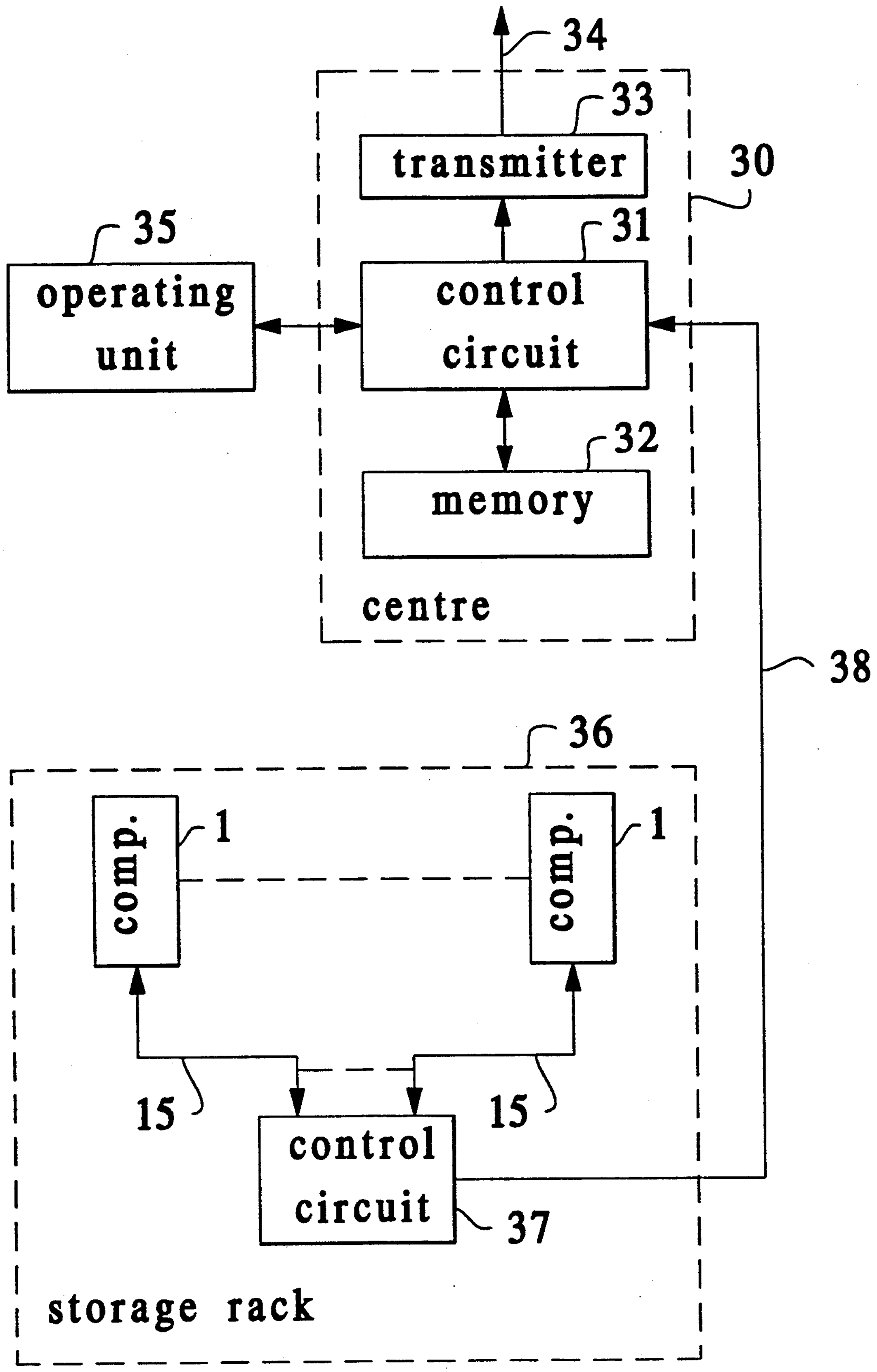
FIG. 3 shows a diagram of an embodiment of a detection system according to the invention.

The personnel paging system furthermore comprises, as shown in FIGS. 3 and 7, a centre 30 having a control circuit 31, which is connected to a random access memory (RAM) 32, and a transmitter 33, which is connected to an aerial 34. The control circuit 31 is also connected to an operating unit 35 which may form part of the centre 30 and/or may comprise a separate computer and which may be connected to a telephone exchange (not shown) in order to operate the control circuit 31 remotely.

To page a user to whom the paging unit 18 has been assigned, a paging message is assembled, in the centre 30 and/or the operating unit 35, which contains the identification number of the paging unit 18 and said message is transmitted via the transmitter 33 and the aerial 34. When the transmission signal transmitted by the exchange 30 is received by the paging unit 18, the receiving circuit 20 detects and demodulates the received transmission signal and supplies the message received to the decoder 21, which separates the identification number and the other data of the message. The comparator 22 compares the identification number received with the identification number stored in the register 24 and in the event of identity, it supplies a clearing signal to the control circuit 23 for the further processing of the other data received, which can be presented by means of the signalling device 26.

The presence detection system shown in FIG. 3, which is used for a personnel paging system, comprises, in addition to the centre 30, at least one storage rack 36 having a number of compartments 1 which each do not have (mode of operation according to FIG. 4) or do have (mode of operation according to FIG. 6) a switch 9. Each compartment 1 is connected via a conductor group 15 to a control circuit 37 of the rack 36. The control circuit 37 is connected via a connection 38 to the control circuit 31 of the centre 30.

The mode of operation of the presence detection system will be explained below with reference to FIGS. 4 and 5 if switches 9 of the compartments 1 are not used, and later with reference to FIGS. 5 and 6 if switches 9 are used.

It is pointed out that in all the flow diagrams, "Y" and "N" represent a "yes" and "no" answer, respectively, to a question posed in an adjacent block.

Figure 4:
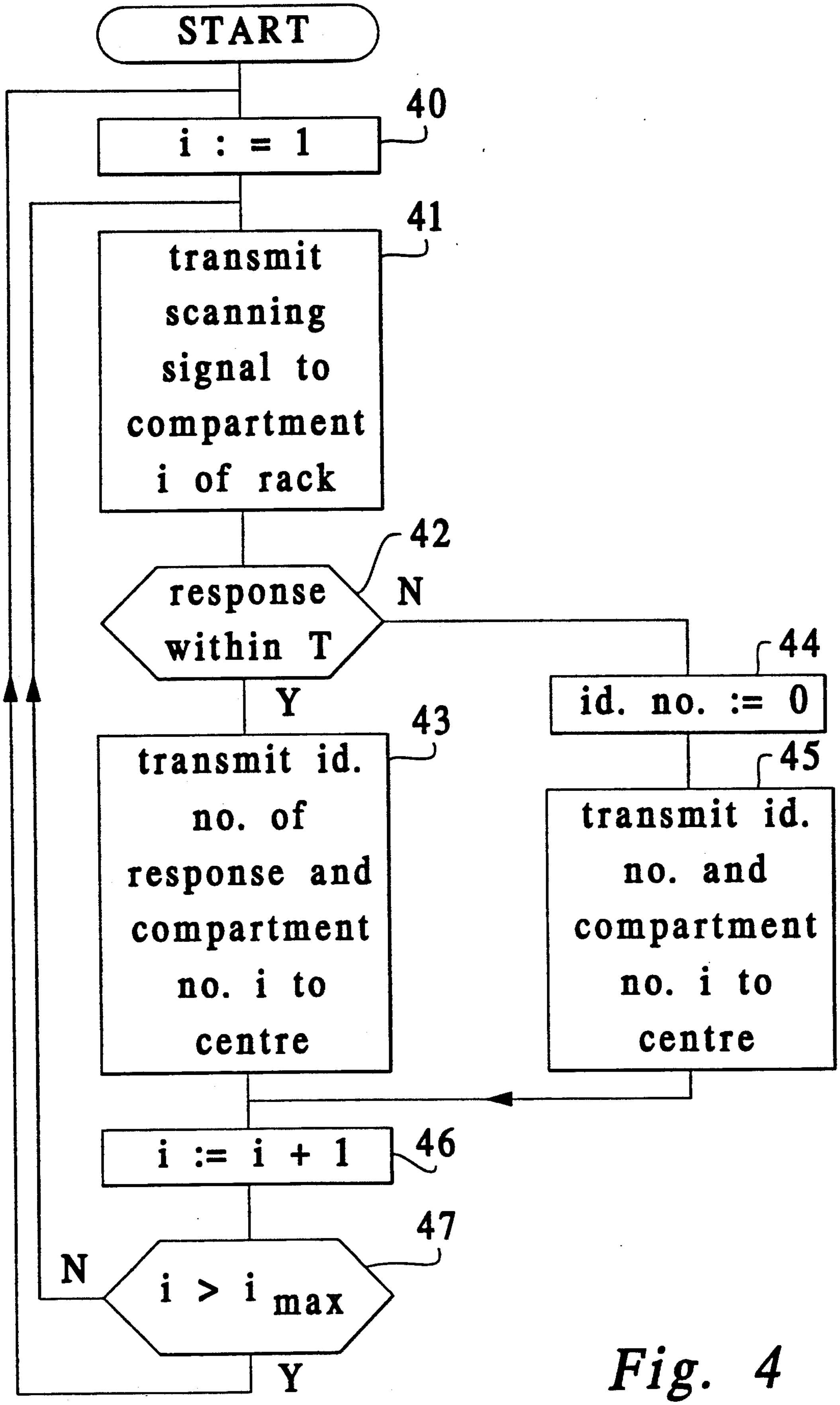
FIG. 4 shows a flow diagram of the mode of operation of a control circuit of a rack of the system of FIG. 3, in which the racks do not have a presence detection means.

FIG. 4 shows the flow diagram of the mode of operation of the control circuit 37 of the rack 36 of the system of FIG. 3. According to this mode of operation, all the compartments 1 of the rack 36 are continuously and cyclically scanned. For this purpose, a counting variable i for the compartment number is, according to block 40, first made 1. Then, according to block 41, a scanning transmission signal, which may be a very simple signal such as a single pulse, is transmitted to the compartment having the number i. If, according to block 42, the control circuit 37 receives a response signal within a predetermined time T, block 43 of the diagram is proceeded to, and if not, block 44.

According to block 43, the control circuit 37 transmits the identification number which is present in a response signal received from a compartment i and the compartment number i to the control circuit 31 of the centre 30 via the connection 38.

According to block 44, the identification number is made 0, it being assumed that there is no portable unit having the identification number 0. Then, according to block 45, the control circuit 37 transmits the identification number, which is 0, and the compartment number i to the centre 30.

After block 43 and block 45, the counting variable i is increased by 1 according to block 46. Unless, according to block 47, i is greater than $i_{max}$, which is equal to the number of compartments of the rack 36, the part of the flow diagram comprising the blocks 41 to 47 inclusive is repeated, and if not, block 40 is returned to.

Figure 5:
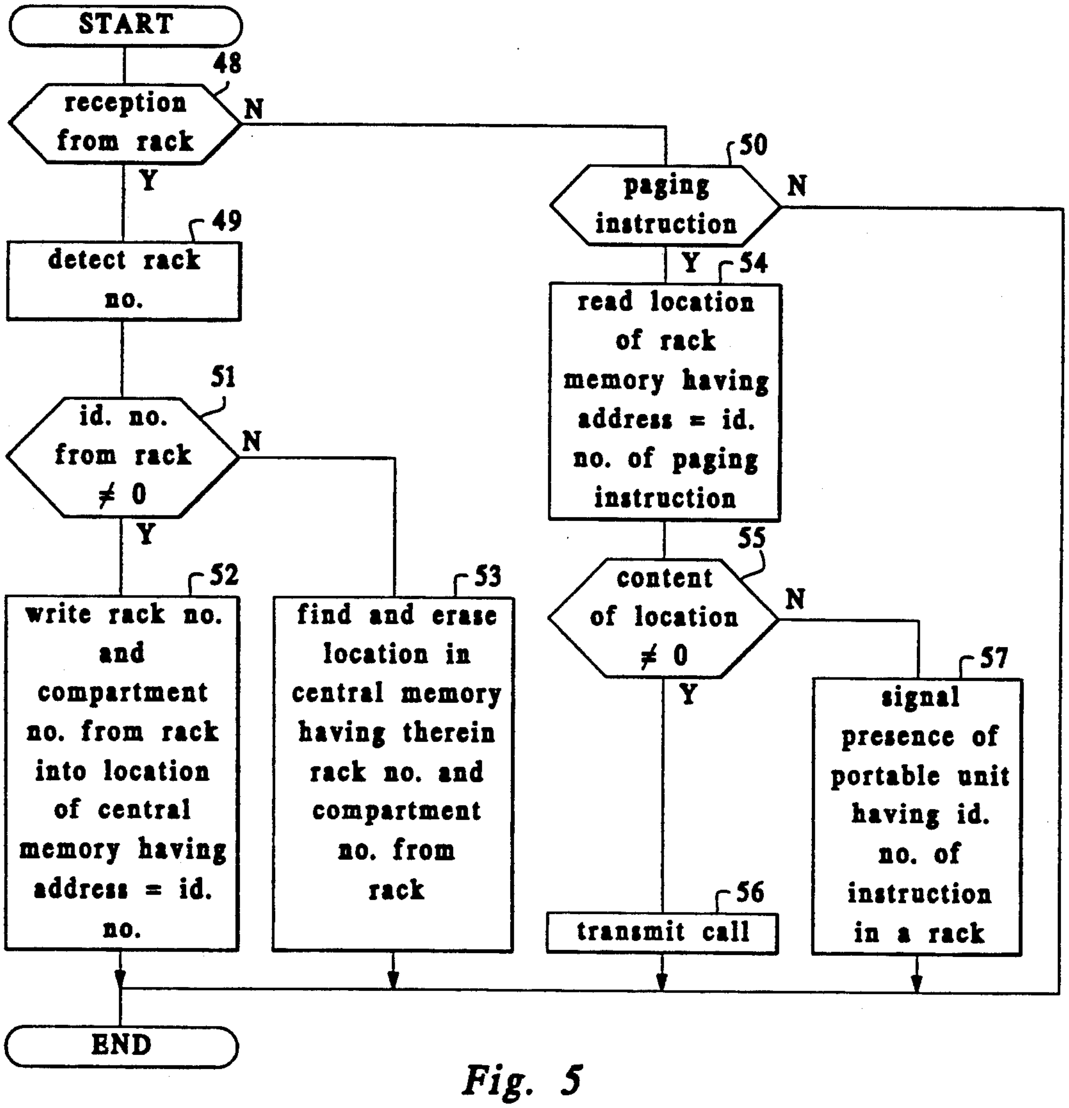
FIG. 5 shows a flow diagram of the mode of operation of the control circuit of the centre of the system of FIG. 3, in which the compartments do or do not have a presence detection means.

FIG. 5 shows a flow diagram of the mode of operation of the control circuit 31 of the centre 30 of the system of FIG. 3, regardless of whether the compartments 1 do or do not have a switch 9.

If, according to block 48, a signal is received from a rack, block 49 is proceeded to, and if not, block 50.

According to block 49, the number of the rack 36 is detected. Detection of the rack number is possible in a simple manner if the control circuit 37 of the rack 36 also transmits the number of the rack in a transmission. If each rack 36 is connected by an individual connection 38 to the centre 30, the rack number may also be derived from the wiring.

If, according to block 51, the identification number received from a rack is not equal to 0, block 52 is proceeded to, and if not, block 53.

According to block 52, the control circuit 31 writes the rack number detected and the compartment number received from the rack into a location of the central memory 32 whose address is identical to that of the identification number received from the rack.

According to block 53, the control circuit 31 looks for the location in the central memory 32 in which the detected rack number and the compartment number received from the rack has been received. This location is then erased.

If, according to block 50, the control circuit 31 receives, for example from the operating means 35, a paging instruction, block 54 is proceeded to, and if not, the end of the diagram is reached.

According to block 54, the control circuit 31 reads the location of the rack memory whose address is identical to the identification number of a call to be transmitted according to the instruction. If, according to block 55, the contents of this location are not equal to 0, block 56 is proceeded to and if not, block 57. According to block 56, the control circuit 31 transmits the call. According to block 57, the control circuit 31 signals the presence in a rack 36 of the portable unit having the identification number of the instruction.

After each of the blocks 52, 53, 56 and 57, the end of the diagram is reached.

Figure 6:
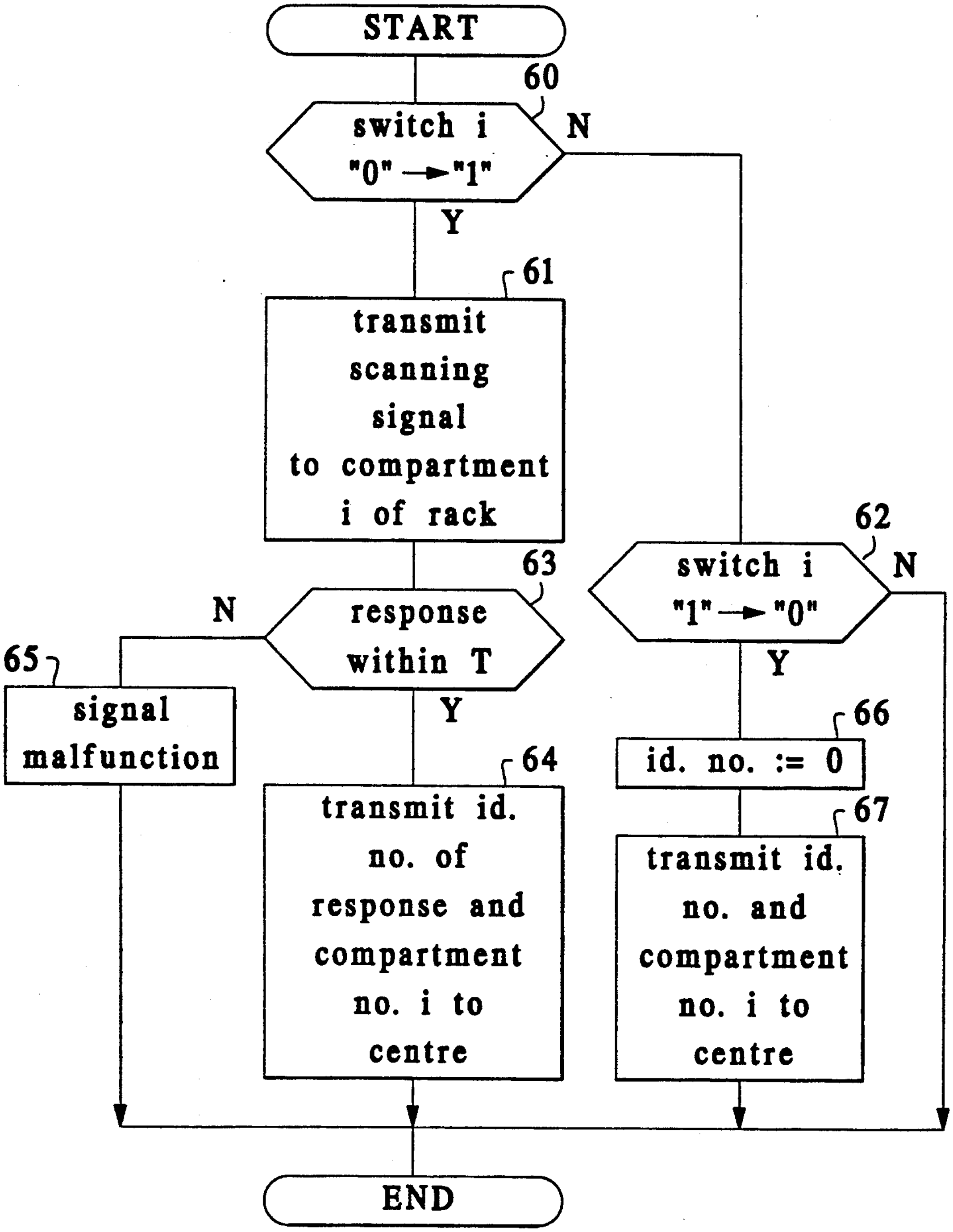
FIG. 6 shows a flow diagram of the mode of operation of the control circuit of the rack of the system of FIG. 3, in which the compartments each have a presence detection means.

The flow diagram of FIG. 6 relates to the mode of operation of the control circuit 37 of a rack 36, the compartments 1 of which each have a detection means such as a switch 9.

If, according to block 60, the control circuit 37 detects that a switch i goes from a first logical state represented by "0" to a second logical state represented by "1", which occurs when a portable unit 18 is placed in the compartment 1 having number i, block 61 is proceeded to, and if not, block 62.

According to block 61, the control circuit 37 transmits the scanning signal to the compartment i of the rack 36. If, according to block 63, the control circuit 37 then receives a response signal within a predetermined time T, block 64 is proceeded to, and if not, block 65.

According to block 64, the control circuit 37 transmits the identification number present in the response signal received and the compartment number i to the centre 30.

If the control circuit 37 does not receive a response signal in time, the control circuit 37 indicates, according to block 65, a malfunction.

If, according to block 62, the switch goes from the second state "1" to the first state "0", which occurs if a portable unit is taken out of the compartment, block 66 is proceeded to, and if not, the end of the diagram is reached. According to block 66, the control circuit 37 makes the identification number 0, it being assumed that the personnel paging system does not contain a portable unit 18 having identification number 0. Then the control circuit 37 transmits, according to block 67, the identification number, which is 0, and the compartment number i to the centre 30.

After termination of each of the blocks 64, 65 and 67, the end of the diagram is reached.

The embodiment, shown in FIG. 7, of a presence detection system according to the invention differs from the embodiment of FIG. 3 in that the control circuit 31' of the centre 30 and the control circuit 37' of the rack 36 operate differently and in that a random access memory 68 of the rack 36 is connected to the control circuit 37'. According to the flow diagram of FIG. 8 of the mode of operation of the control circuit 37', a current counting-variable i is made 1, according to block 70, at the beginning of the diagram. Then the control circuit 37' reads, in a location of the rack memory 68 having address i, an identification number stored therein. The control circuit 37' then transmits, according to block 72, the scanning signal to the compartment i.

If, according to block 73, the identification number read then proves to be 0, block 74 is proceeded to, and if not, block 75.

If, according to block 74, a response signal is received within a predetermined time T, block 76 is proceeded to, and if not, block 77.

According to block 76, a status variable is made "1". This indicates that a portable unit 18 is present in the compartment i and that a response signal has been received from the unit 18 within the time T. Then the control circuit 37' writes, according to block 78, the identification number present in the response signal into a location of the rack memory 68 having address i and the control circuit 37' transmits the identification number together with the status to the centre 30. Then block 77 is proceeded to.

If according to block 75, a response signal is received within the time T, block 77 is proceeded to, and if not, block 79.

According to block 79, the status variable is made "0", which indicates that a portable unit 18 previously present in the compartment i has been removed, or at least has not transmitted a response signal within the time T. Then the control circuit 37' transmits, according to block 80, the identification number read and the status to the centre 30. The control circuit 37' then erases, according to block 81, the location of the rack memory 68 having address i, as a result of which the contents thereof indicate an identification number 0. Then block 77 is proceeded to.

According to block 77, the counting variable i is increased by 1.

Unless i is greater than $i_{max}$, which is equal to the number of compartments of the rack, according to block 82, block 71 is proceeded to, and if not, block 70.

Just as in the mode of operation according to the flow diagram of FIG. 4, the compartments 1 of the rack 36 are continuously and cyclically scanned. According to the mode of operation of FIG. 8, the number of transmissions from the rack 36 to the centre 30 is, however, limited because transmission only takes place if a mutation occurs in the presence or absence of a paging unit 18 in a compartment 1.

Figure 9:
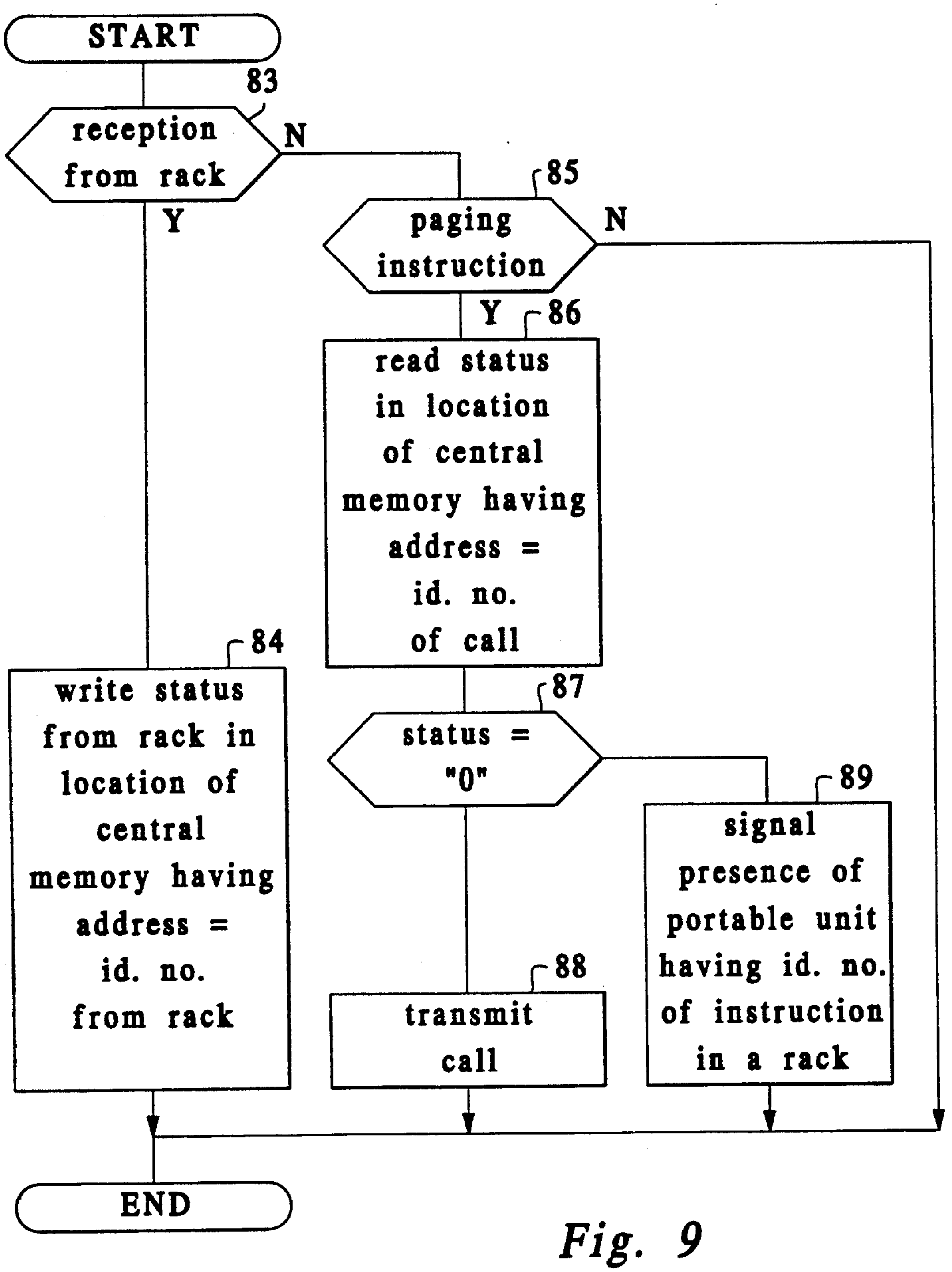
FIG. 9 shows a flow diagram of the mode of operation of the control circuit of the centre of the system of FIG. 7, in which the compartments do or do not have a presence detection means.

FIG. 9 shows the mode of operation of the control circuit 31' of the centre 30 of the system of FIG. 7.

If, according to block 83, the control circuit 31' receives a signal from a rack 36, block 84 is proceeded to, and if not, block 85.

According to block 84, the control circuit 31' writes the status received from the rack 36 into a location of the central memory 36 having the identification number received from the rack 36 as address. Then the end of the diagram is reached.

If, according to block 85, the control circuit 31' receives a paging instruction, in particular from the operating means 35, block 86 is proceeded to, and if not, the end of the diagram is reached.

According to block 86, the control circuit 31' reads the status in a location of the central memory 32 having the identification number of the call as address.

If, according to block 87, the control circuit 31' then detects that the status read out is "0", block 88 is proceeded to, and if not, block 89.

According to block 88, the control circuit 31' transmits the call. Then the end of the diagram is reached.

According to block 89, the control circuit 31' signals the presence of the portable unit 18 having the identification number of the instruction in a rack 36. Then the end of the diagram is reached.

Figure 10:
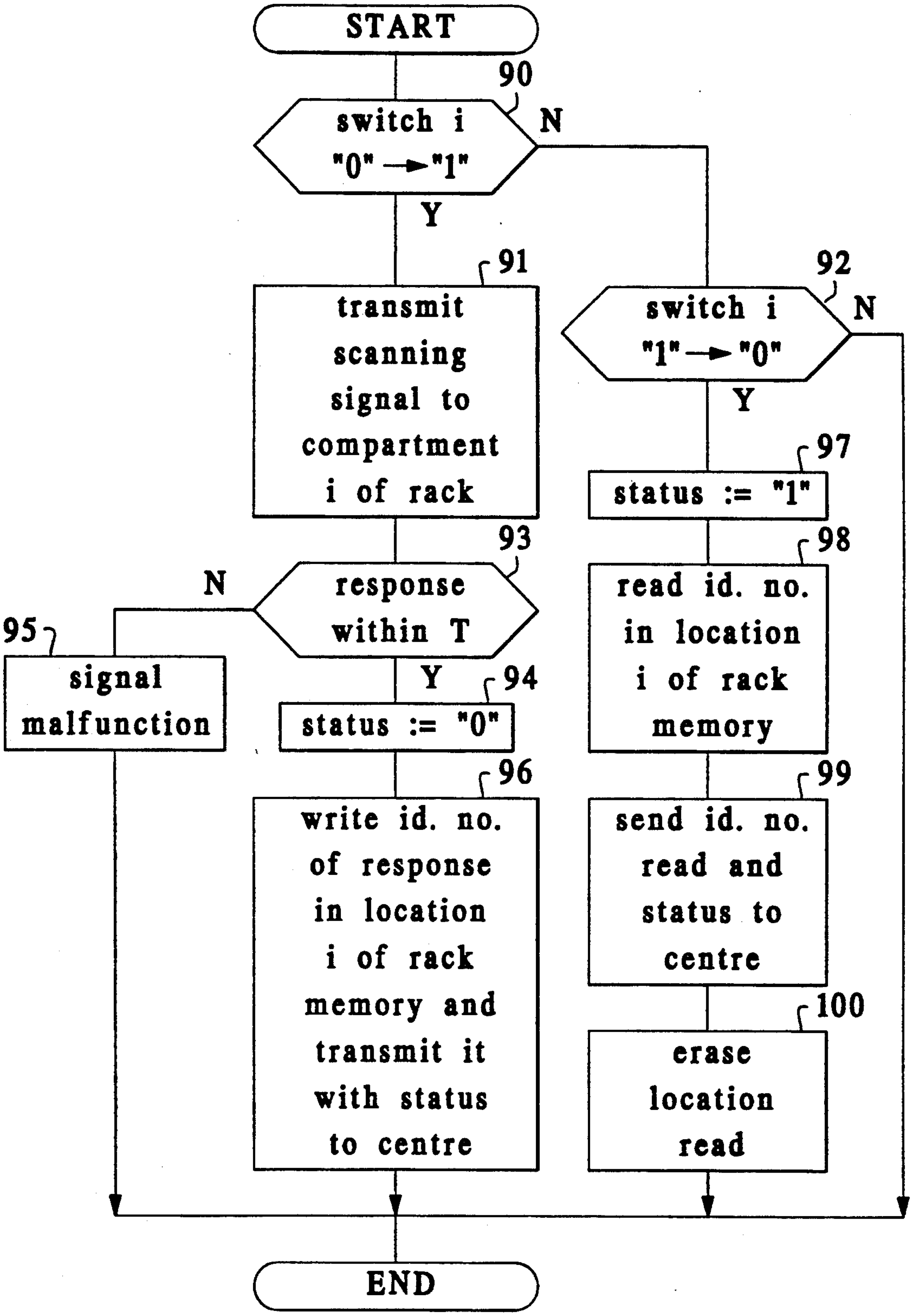
FIG. 10 shows a flow diagram of the mode of operation of the control circuit of a rack of the system of FIG. 7, in which the racks each have a presence detection means.

FIG. 10 shows a flow diagram of the mode of operation of the control circuit 37' of the system of FIG. 7 if the compartments each have a detection means such as the switch 9.

If, according to block 90, the switch has gone from "0" to "1", which indicates the placing of a paging unit 18 in the compartment 1 having number i, block 91 is proceeded to, and if not, block 92. According to block 91, the control circuit 37' transmits the scanning signal to the compartment i of the rack 36. If, according to block 93, a response signal is then received within a predetermined time T, block 94 is proceeded to, and if not, block 95.

According to block 94, a status variable is made "1". Then according to block 96, the control circuit 37' writes the identification number present in the response signal into the memory 68 and transmits it with the status to the centre 30. Then the end of the diagram is reached.

According to block 95, the control circuit 37' signals a malfunction, which indicates that, although the placing of a paging unit 18 in a compartment i has been detected, a response signal has not been received on time. Then the end of the diagram is reached.

If, according to block 92, the switch i goes from "1" to "0", which indicates that a paging unit 18 has been removed from the compartment i, block 97 is proceeded to, and if not, i.e. if there is no change in a switch i, the end of the diagram is reached.

According to block 97, the status is made "0". The control circuit 37' then reads, according to block 98, the identification number in a location i of the rack memory 68. The control circuit 37' then transmits, according to block 99, the identification number read and the status to the centre 30. According to block 100, the location read may then possibly be erased. The end of the diagram is then reached.

Figure 8:
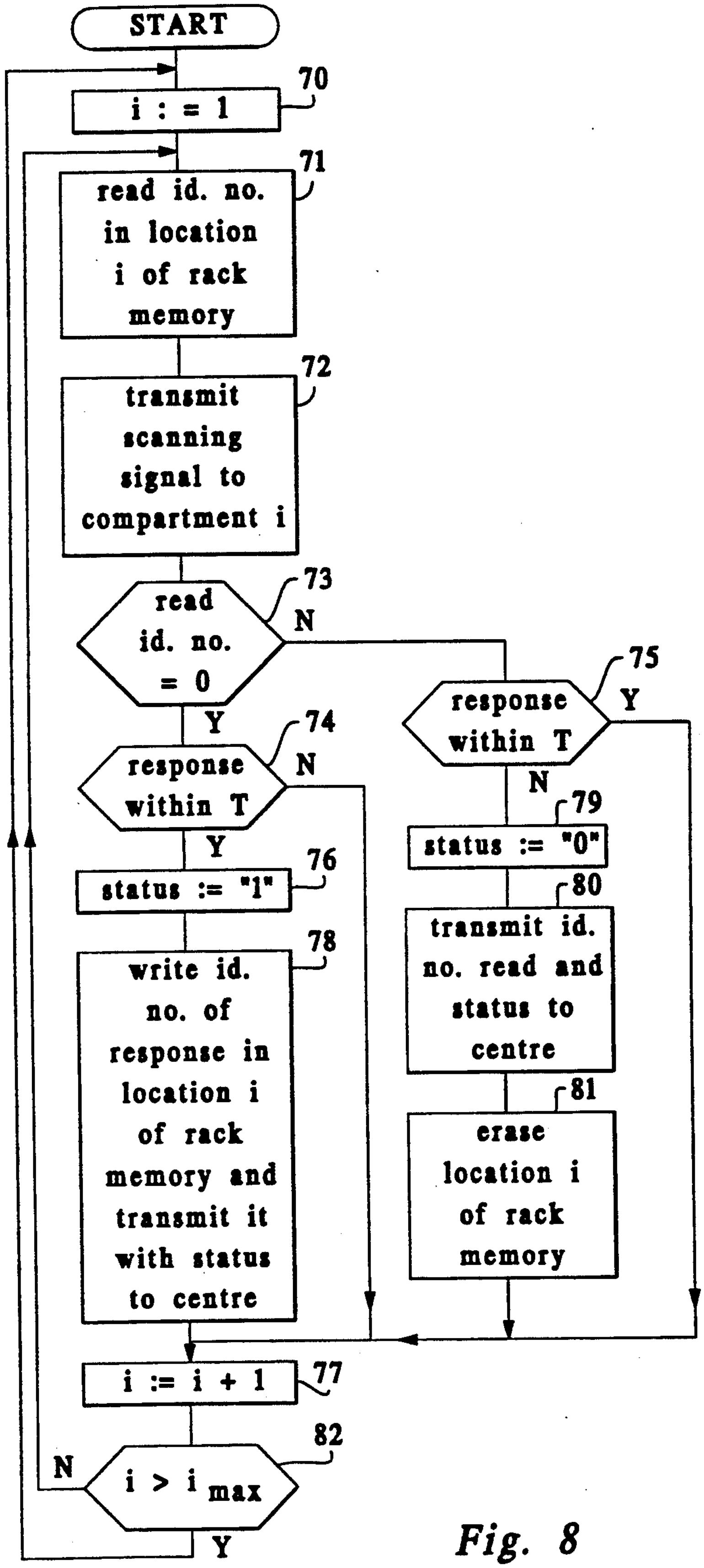
FIG. 8 shows a flow diagram of the mode of operation of the control circuit of a rack of the system of FIG. 7, in which the compartments do not have a presence detection means.

The mode of operation according to the diagram of FIG. 10 has, in addition to the advantage mentioned of the mode of operation of the diagram according to FIG. 8 (fewer transmissions), the advantage, compared with the mode of operation according to the diagram of FIG. 4, that the control circuit 37' of the rack 36 is only activated if a paging unit 18 is placed in a compartment 1 or a paging unit 18 is removed from a compartment 1.

It is pointed out that, within the scope of the invention, the flow diagrams explained can be extended by means of, for example, program sections with which the integrity of the contents of the memories 32 and 68 can be monitored. In the branch "Y" emerging from the block 75 of FIG. 8, a program section can, for example, be incorporated, by means of which the control circuit 37 signals a malfunction if the identification number of a response signal received is not equal to the identification number read according to block 71. It is also possible to alter the diagrams in a manner such that, if no response is received within a predetermined time T, the steps concerned are repeated until a maximum number of times has been reached, after which the control circuit 37 or 37' signals a malfunction.

The contacts 4*a* to 5*b* inclusive and 7*a* to 8*b* inclusive may also be replaced by an optical coupling or an inductive coupling (with a "transformer" winding in each compartment and in each portable unit 2), which may each be bidirectional.

Figure 11:
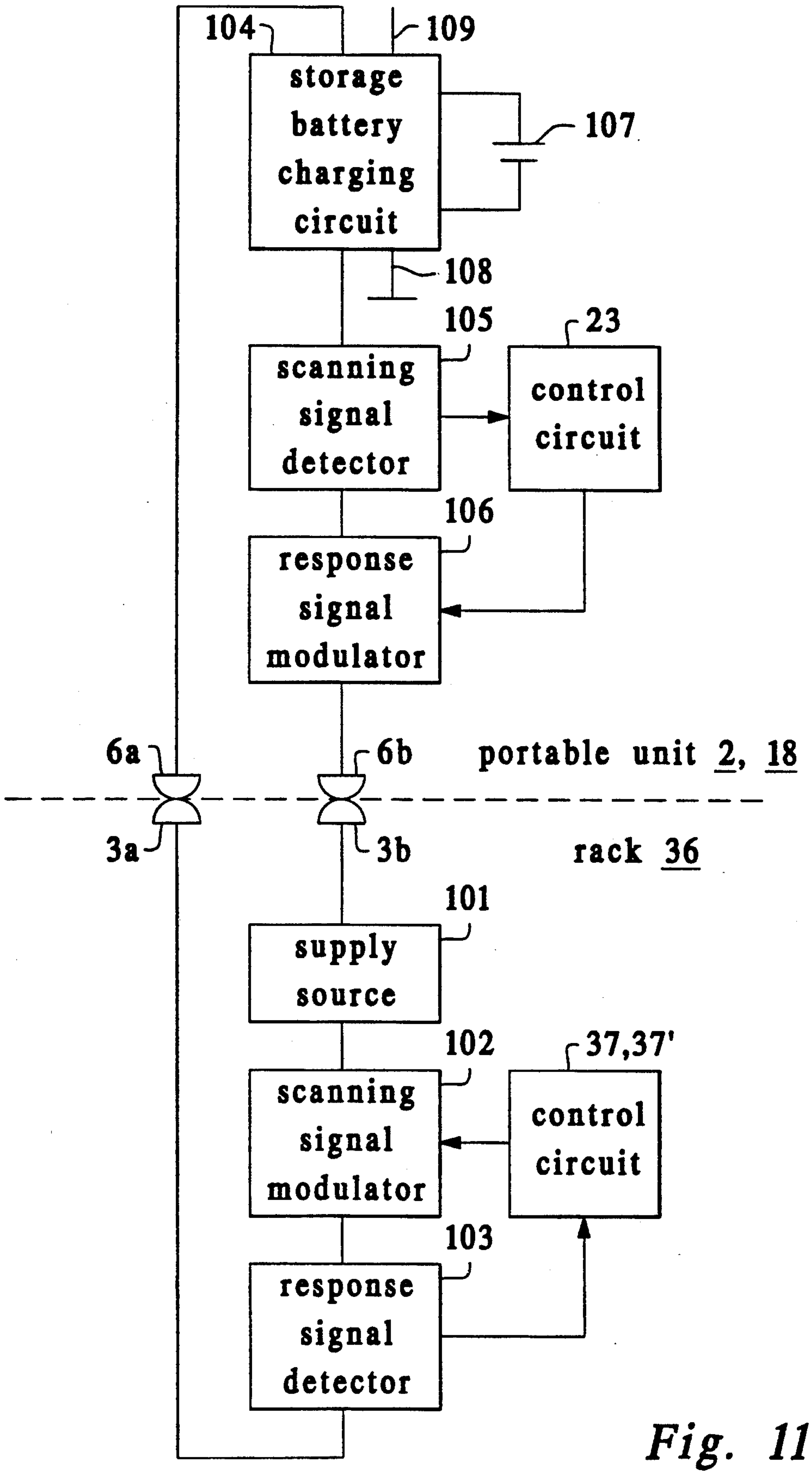
FIG. 11 shows a diagram of parts of a portable unit and of a rack for the transfer of a scanning signal and a response signal via a charging current path for charging a storage battery of the portable unit from the rack.

In addition, as will be explained with reference to FIG. 11, it is possible to use the charging current path via the contacts 3*a*, 3*b* and 6*a*, 6*b* for transmitting a scanning signal to a portable paging unit 2 in a compartment 1 and for receiving a response signal from the unit 2. For this purpose, a series circuit of a supply source 101, a scanning signal modulator 102 and a response signal detector 103 is connected in the rack 36 between the contacts 3*a* and 3*b*. The supply source 101 is, in particular, a current source and supplies a charging current for the portable unit 2. The modulator 102 receives a modulating signal from the control circuit 37, 37, of the rack 36 and is composed, for example, of a variable resistor, which may be formed by a FET. The detector 103 detects the flow of a charging current which, as explained below, may be modulated, and supplies a detection signal corresponding thereto to the control circuit 31. The detector 103 may be an optical coupling.

Between the contacts 6*a* and 6*b*, which, when the portable unit 2 or 18 is placed in the rack 36, touch the contacts 3*a* and 3*b*, respectively, a series circuit of a storage battery charging circuit 104, a scanning signal detector 105 and a response signal modulator 106 is connected in each portable unit 2, 18. The storage battery charging circuit 104 is connected to a storage battery 107 of the portable unit and has a mass terminal 108 and a supply terminal 109 for the portable unit. The storage battery charging circuit 104 is composed, according to a particularly simple embodiment, of a connection of the terminal 109 to the contact 6*a*, of the terminal 108 to the detector 105 and a connection of the terminals of the storage battery 107 to the terminals 109 and 108.

The scanning signal detector 105 detects a modulation of the charging current and supplies in accordance therewith a scanning signal to the control circuit 23 of the portable unit 2, 18. The detector 105 is, for example, an optical coupling.

The modulator 106 receives, as modulating signal, the response signal from the control circuit 23 for modulating the charging current therewith. The modulator 106 may be a variable resistor which is formed, for example, by an FET.

Because the scanning signal and the response signal do not occur simultaneously, the modulation can occur in the same way in the modulators 102 and 106. During modulation by the modulator 102 or 106, the control circuit 37, 37' or 23, respectively, must then ignore the response signal from the detector 103 or the scanning signal from the detector 105, respectively.

It is pointed out that where an identification number equal to 0 is understood to mean in the explanation that no portable unit is present in the scanned compartment or was present in the previous scanning, another indication can be used instead thereof, for example a separate status bit having the value "0" or "1" in order to indicate that there is not or is, respectively, a portable unit in a scanned compartment of the rack 36 or it was present in a previous scanning. As a result of this, unused portable units having identification number 0 can be placed in a rack for charging.

In relation to FIGS. 5 and 9 for writing or reading a memory location of the central memory, it is pointed out that it is also possible, within the scope of the invention, that the central memory contains fewer memory locations assigned to the portable units than the maximum number of portable units of the system determined by the largest possible number. In this regard, a memory location can be assigned to each portable unit, the address of which location is not necessarily identical to the identification number of the portable unit.

It is furthermore pointed out that the scanning of the compartments of a rack can also take place autonomously for each compartment. For this purpose, a subcontrol circuit having a register can be added to each compartment of a rack and each subcontrol circuit is connected to the transmission means and the reception means of the associated compartment in order to transmit a scanning signal or to receive a reception signal, respectively, from a portable unit placed in the compartment, and to a common control circuit of the rack. The subcontrol circuits operate in the manner as explained above for the control circuit 37, 37' of the rack, with the difference that each subcontrol circuit operates autonomously and stores a presence datum which comprises an identification number possibly received by means of a response signal, in the register thereof and the common control circuit communicates with the subcontrol circuits connected thereto in order to transfer the presence data present in the registers to the memory connected to the common control circuit. The embodiment of the detection unit of the rack may be as shown in FIGS. 3 and 7, with the difference that, in each connection between a compartment 1 and the control circuit with the mode of operation explained above, a subcontrol circuit is incorporated for autonomous subcontrol and intermediate storage. The centre 30 having the control circuit 31 or 31' may in this case remain unchanged and the mode of operation thereof remains according to the flow diagrams shown in FIGS. 5 and 9 respectively.

It is pointed out in addition that the invention can be implemented in particular by using a microprocessor for the control circuits 31, 31', 37 and 37' and the subcontrol circuits of the compartments so that the mode of operation thereof can be altered in a simple manner and the invention is therefore explained, in particular, with reference to flow diagrams. It is, however, also possible to implement the invention with non-programmable components; by using the flow diagrams, a person skilled in the art will have few problems herewith.

What is claimed is:

1. A portable transmission unit detection system comprising:

a rack having a plurality of compartments;

a plurality of portable transmission units (PTU), each portable unit having:

a PTU control circuit;

communication means connected to the control circuit for performing at least one of wireless transmission and wireless reception of a signal containing an identification number assigned to the unit;

a register for storing the assigned identification number;

a PTU reception means for receiving a scanning signal from outside the unit; and a PTU transmission means for transmitting a response signal containing the identification number of the portable unit in response to a received scanning signal; and a detection unit associated with said rack and having;

a plurality of individual detection unit transmission means each assigned to one of said compartments and paired, when one of said portable units is placed in said one of said compartments, with said PTU reception means of said one of said portable units so that the PTU reception means of the pair is only sensitive to a scanning signal transmitted by the individual detection unit transmission means of the pair, all of said individual detection unit transmission means transmitting a scanning signal identical for all of said compartments;

a detection unit reception means for receiving a response signal;

a memory having a location for each portable unit for storing therein a datum which indicates the presence of the portable unit in the rack; and a rack control circuit connected to said plurality of individual detection unit transmission means, said detection unit reception means for receiving a response signal, and said memory, for selectively choosing an individual detection unit transmission means to transmit said scanning signal and for monitoring whether or not a response signal is received, said rack control circuit altering the contents of a memory location associated with the identification number of the response signal to indicate presence of the associated portable unit in the rack when a response signal is received, and, when no response signal is received in response to a last scanning signal transmitted via a particular individual detection unit transmission means but a response signal has been received in response to a next-to-last scanning signal transmitted via said particular detection unit individual transmission means, said rack control circuit altering the contents of an associated memory location to indicate the absence of the portable unit in the rack.

2. The presence detection system according to claim 1, wherein the memory is a central memory, rack control circuits of a plurality of racks are connected to a central control circuit which is connected to the memory and wherein, a rack control circuit, on receiving a response signal from a compartment, transmits a number assigned to the compartment and the identification number of the response signal to the central control circuit which, in response thereto, stores in the associated datum location the compartment number received and a number assigned to the rack as presence datum, and, on detecting a movement of a portable unit from a compartment, the rack control circuit transmits a datum corresponding thereto and the compartment number to the central control circuit, which in response thereto alters the content of the presence datum location with the compartment number therein and the associated rack number in a manner such that the absence of the portable unit in a rack is indicated.

3. Presence detection system according to claim 2, wherein, on receiving a response signal, the rack control circuit transmits a number assigned to the rack to the central control circuit.

4. Presence detection system according to claim 2, wherein each rack control circuit is connected to the central control circuit via an individual connection and the rack number is determined by the connection to the rack control circuit.

5. Presence detection system according to claim 1, wherein a detection unit having a rack control circuit and a memory is assigned to each of a plurality of racks, the rack control circuits being connected to a central control circuit, which is connected to a central memory having a location for storing a presence datum for all the portable units, the memory of each rack having locations which are assigned to the compartments of the rack for storing the identification number of a portable unit placed in the associated compartment therein as presence datum, wherein, on a change of the contents of a presence datum location of the rack memory the rack control circuit controls the central control circuit in order to change in accordance therewith a presence datum location of the central memory assigned to the portable unit of the change.

6. Presence detection system according to claim 1, wherein the rack control circuit continuously transmits sequentially the scanning signal via the individual detection unit transmission means for all the compartments of the rack.

7. Presence detection system according to claim 1, wherein each compartment has a detection means connected to the track control circuit, the detection means supplies a detection signal if a portable unit is moved into or out of the compartment, and the rack control circuit transmits the scanning signal on receiving a detection signal via the individual detection unit transmission means of the compartment.

8. Presence detection system according to claim 7, wherein the detection signal has a first or second state, respectively, corresponding to the movement into or out of the compartment, and, on receiving a detection signal having the first state, the rack control circuit transmits the scanning signal and, on receiving a detection signal having the second state, alters the contents of the memory location of a portable unit previously accessed for the associated compartment to indicate the absence of the portable unit in a rack.

9. Presence detection system according to claim 7, wherein the presence detection means is a switch.

10. Presence detection system according to claim 7, in which the rack has supply means for charging a storage battery of the portable unit via an electrically conductive connection whenever a portable unit is placed in a compartment, wherein the presence detection means is a detection circuit for detecting the flow of a charging current to a portable unit in the associated compartment.

11. Presence detection system according to claim 1, wherein a detection unit transmission means/PTU reception means pair of the compartment and the portable unit form an electrically conductive, optical or inductive coupling whenever a portable unit is placed in a compartment.

12. Presence detection system according to claim 11, in which the rack has supply means for charging a storage battery of the portable unit via an electrically conductive connection whenever a portable unit is placed in a compartment, wherein the coupling is formed by the electrically conductive connection for charging the storage battery, an individual PTU transmission means comprises a modulator for modulating the charging current, and a detection unit reception means comprises a detection circuit for detecting a modulation of the charging current.

13. Presence detection system according to claim 1, wherein the detection unit transmission means/PTU reception means pair of the compartment and the portable unit form a common coupling whenever a portable unit is placed in a compartment.

14. Presence detection system according to claim 11, in which the rack has supply means for charging a storage battery of the portable unit via an electrically conductive connection whenever a portable unit is placed in a compartment, wherein the coupling is formed by the electrically conductive connection for charging the storage battery, an individual detection unit transmission means comprises a modulator for modulating the charging current, and a PTU reception means comprises a detection circuit for detecting a modulation of the charging current.

15. Presence detection system according to claim 1, wherein the rack comprises a number of subcontrol circuits which are each assigned to a respective compartment of the rack, each subcontrol circuit is connected to the individual detection unit transmission means and the detection unit reception means of the associated compartment, each subcontrol circuit has a register for intermediate storage of the presence datum of a portable unit placed in the compartment, the presence datum containing the identification number of the portable unit, and each subcontrol circuit is connected to the rack control circuit and to the memory for transferring the presence datum in a register to the memory.

* * * * *